United States Patent [19]

Greenberg

[11] Patent Number: 4,655,994
[45] Date of Patent: Apr. 7, 1987

[54] METHOD FOR DETERMINING THE OPERABILITY OF A SOURCE RANGE DETECTOR

[75] Inventor: Lesley Greenberg, Monroeville, Pa.
[73] Assignee: Westinghouse Electric Corp., Pittsburgh, Pa.
[21] Appl. No.: 567,447
[22] Filed: Dec. 30, 1983
[51] Int. Cl.⁴ .................................................. G21C 17/00
[52] U.S. Cl. ..................................... 376/254; 376/255; 376/259
[58] Field of Search ............................ 376/254, 255, 259

[56] References Cited

U.S. PATENT DOCUMENTS

| | | | |
|---|---|---|---|
| 3,296,440 | 1/1967 | Schultz et al. | 376/254 |
| 3,873,840 | 3/1975 | Ellis | 376/255 |
| 3,979,256 | 9/1976 | Keefe | 376/259 |
| 4,044,301 | 8/1977 | Allain et al. | 376/255 |
| 4,186,048 | 1/1980 | Thomas | 376/254 |
| 4,493,811 | 1/1985 | Seki et al. | 376/254 |
| 4,495,144 | 1/1985 | Lingren et al. | 376/255 |

FOREIGN PATENT DOCUMENTS 2287751  5/1975  France .

Primary Examiner—Salvatore Cangialosi
Attorney, Agent, or Firm—Daniel C. Abeles

[57] ABSTRACT

A method of determining the operability of a source range detector located adjacent a nuclear reactor in which the source range detector generates a count corresponding to the neutrons emitted by the reactor when the reactor is operating within the source range and a predetermined voltage is applied across the electrodes of the detector, the detector being subject to destruction when the reactor power level is above the source range and the predetermined voltage is applied across its electrodes. The method includes the steps of: (a) operating the reactor at a power level above the source range; (b) applying a voltage across the electrodes of the detector, the voltage having a magnitude below that necessary to generate a neutron count from the detector; (c) gradually increasing the magnitude of the voltage across the electrodes of the detector until the detector just begins to generate a neutron count; (d) reducing the voltage across the electrodes of the detector; and (e) replacing the detector if a neutron count is not generated in step (c) at a voltage having a magnitude less than the predetermined voltage.

8 Claims, 2 Drawing Figures

METHOD FOR DETERMINING THE OPERABILITY OF A SOURCE RANGE DETECTOR

BACKGROUND OF THE INVENTION

1. Field of the Invention

The present invention relates to a method for determining the operability of a source range detector disposed in the vicinity of an operating nuclear reactor. In particular, it provides a method of determining the operability of a source range detector, without damaging the detector, while the reactor is operating in the intermediate or power range.

2. Description of the Prior Art

The power level of a nuclear reactor is generally divided into three ranges: the source or start-up range, the intermediate range and the power range. The power level of the reactor is continuously monitored to assure safe control and operation. Such monitoring is conducted by means of neutron detectors placed outside but adjacent to the reactor core for measuring the neutron flux of the reactor. Since the neutron flux at any point in the reactor is proportional to the fission rate, the neutron flux is also proportional to the power level of the reactor.

Fission and ionization chambers have been used to measure neutron flux in the intermediate and power range of a reactor. Such fission and ionization chambers are capable of operation at all normal reactor power levels without damage; however, they are generally not sensitive enough to accurately detect the low level neutron flux emitted in the source range. Thus, separate low level or source range detectors are used to monitor neutron flux when the power level of the reactor is in the source range.

As disclosed in U.S. Pat. No. 4,186,048, it is known to use proportional counters as source range detectors because they are extremely sensitive and hence highly suitable to detect the low energy radiation produced by a nuclear reactor in its start-up range. A typical proportional counter used for such purposes is a Type WL-23706 boron trifluoride ($BF_3$) gas-filled proportional counter made by Westinghouse Electric Corporation. Such a proportional counter has an electrode structure which includes a fine central wire which acts as the anode and an annular cathode which surrounds the anode.

In operation, incident neutron radiation will liberate electrons from gas atoms within the counter to create electron-ion pairs. A high electric field is produced between the electrodes of the device by applying a corresponding high voltage across the electrodes. As a result, gas multiplication or avalanche gain occurs in the high field region surrounding the wire anode whereby the initial electrons liberated by neutrons collide with other gas atoms to create additional electron-ion pairs in the gas. The resulting charge is swept out of the gas by the electric field, the electrons moving to the anode, and positive ions moving to the cathode. The moving charge causes a current to flow in an external circuit.

When the nuclear reactor is operating at a power level above the source range, it is generally necessary to de-energize the source range detectors since the neutron flux at those operating levels would produce a current in the proportional counter which could melt or severely damage the wire anode. This mode of operation presents a problem in that prior to reducing the reactor power level to the source range, it is not known whether the source range detector is operable.

To date the only method of determining the operability of the above type of source range detector is to wait until the reactor power has decreased to the low intermediate range (which overlaps with the upper end of the source range) and then to turn on the detector to see if it operates. However, this manner of detecting the operability of the source range detector is not entirely satisfactory and can be dangerous because, if the detector is inoperable, there is little if any time to install a spare detector or institute administrative safeguards to insure that the reactor does not inadvertently return to nuclear criticality.

A need thus exists to be able to identify if the source range detector is operable prior to reducing the reactor power to the source range, without damaging the detector in the process.

SUMMARY OF THE INVENTION

It is an object of the invention to provide a method for non-destructively testing the operability of a source range detector at nuclear reactor power levels above the source range.

The above and other objects are accomplished according to the invention wherein a novel method is provided for determining the operability of a source range detector located adjacent a nuclear reactor, including the steps of: (a) operating the reactor at a power level above the source range; (b) applying a voltage across the electrodes of the detector, the voltage having a magnitude below that necessary to generate a neutron count from the detector; (c) gradually increasing the magnitude of the voltage across the electrodes of the detector until the detector just begins to generate a neutron count; (d) reducing the voltage across the electrodes of the detector; and (e) replacing the detector if a neutron count is not generated in step (c) at a voltage having a magnitude less than a predetermined voltage magnitude.

A significant advantage of the method according to the invention is that it permits checking the source range detector during normal operation of the nuclear reactor and allows time for a spare detector to be installed in place of a failed detector or for other administrative safeguards to be undertaken.

In a further aspect of the invention the method may be carried out automatically on a periodic basis to assure operability of the detector. Preferably, a microprocessor is employed to automatically and periodically adjust the voltage.

Also, according to a further feature of the invention, a calibration is performed early in the life of the detector whereby the voltage at which the detector starts counting neutrons at a given reactor power level above the source range is recorded. Thereafter the voltage at which the detector starts counting neutrons at the same reactor power level is compared to the recorded voltage. The voltage difference if any, corresponds to the degree of deterioration of the detector output.

DESCRIPTION OF THE PREFERRED EMBODIMENTS

Figure 1:
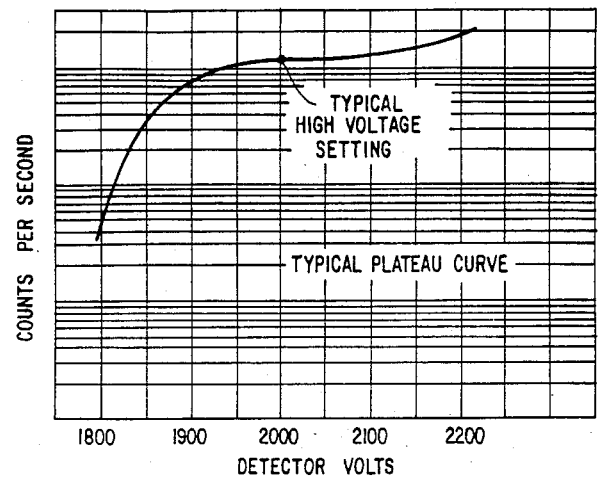
FIG. 1 is a graph showing a typical operating characteristic curve of a $BF_3$ gas-filled proportional counter.

FIG. 1 shows a typical operating characteristic of a BF$_3$ gas-filled proportional counter, such as the Westinghouse WL-23706, with which the method according to the invention can be employed. The method of the invention is not however, limited to a BF$_3$ gas-filled proportional counter, but rather is particularly applicable to any proportional counter having a center wire anode which must be protected against excessive currents while testing for operability at high reactor power levels. A type WL-22791 B$^{10}$ lined proportional counter, also made by Westinghouse Electric Corporation, is another example of a proportional counter with which the method according to the present invention can be used. Still other types of counters may be used in practicing the invention.

Referring to FIG. 1, the curve shows that as the voltage across the electrodes increases the number of neutron events counted by the detector also increases until the detector is counting all neutron events, at which point the curve flattens out.

For source range detection the useful part of the operating characteristic shown in FIG. 1 is between 1800 and 2000 volts, the latter constituting a typical high voltage setting for source range detection. Depending on the particular BF$_3$ detector, the useful part of the curve could range between 1500 and 2500 volts. A B$^{10}$ lined detector has a similar operating characteristic except that the voltage range of the operating part of the characteristic is generally lower, between 750 and 1500 volts.

Referring specifically to the WL-23706 BF$_3$ gas-filled proportional counter, as exemplary only, this counter which is described in greater detail in Westinghouse Technical Data Sheet 86-276T, dated June 1975, has a center wire anode made of tungsten and an 1100 aluminum alloy annular cathode surrounding the wire anode, both of which are disposed in a housing filled with BF$_3$ gas at a pressure of 55 cm Hg. The WL-23706 counter has a sensitivity of 13 counts/neutron/cm$^2$ at an operating voltage of 2000 volts and is designed to operate in the presence of a maximum neutron flux of $10^6$ nv, where nv is the unit neutron flux in neutrons/cm$^2$/sec. The maximum permissible count rate of the WL-23706 is $10^6$ counts per second (cps), after which the current generated through the counter is potentially damaging to the electrode structure. A count rate of $10^6$ cps corresponds to a flux at the top of the source range, or about $10^{-3}$ percent of maximum reactor power. The WL-23706 is thus not designed to operate at its operating voltage in the presence of neutron flux corresponding reactor power levels above the source range.

If for example, the WL-23706 proportional counter were energized in the presence of neutron flux corresponding to the intermediate or power range of a nuclear reactor at a voltage of 2000 volts, which is a typical operating voltage in the source range, the number of neutron events within the counter would result in a current through the counter that would melt the center electrode wire of the counter. This of course would render the counter inoperable.

In order to non-destructively test the operability of such a proportional counter while the reactor is operating at power levels above the source range, the present invention provides for the steps of gradually increasing the voltage across the electrodes of the counter, from an initial voltage magnitude which is well below the level at which the proportional counter will begin to count neutrons, to a magnitude at which the proportional counter just begins to count neutrons, which is indicated by a meter contained in an associated counting channel connected to the proportional counter. Thereafter, the voltage applied to the electrodes is decreased to a safe level (i.e. below the avalanche gain portion of the operating characteristic) so that any current generated by the proportional counter as a result of incident neutron flux would be insufficient to melt the electrodes. As a practical matter the voltage is generally reduced to zero since the source range detector is not used in its operational mode at the high reactor power levels. The initial voltage magnitude from which the voltage is gradually increased is likewise generally zero. However, for a BF$_3$ gas-filled proportional counter the initial voltage magnitude could be up to approximately 560 volts, 560 volts being below the avalanche gain portion of the operating characteristic for a BF$_3$ gas-filled proportional counter and hence below the level which could produce a damaging current through the counter. For a B$^{10}$ lined proportional counter the initial voltage magnitude could be up to approximately 250 volts.

If the proportional counter does not generate a count by the time the applied voltage reaches its rated maximum operating voltage, the counter is presumed defective and appropriate administrative safeguards are undertaken, such as replacing or repairing the defective counter.

Figure 2:
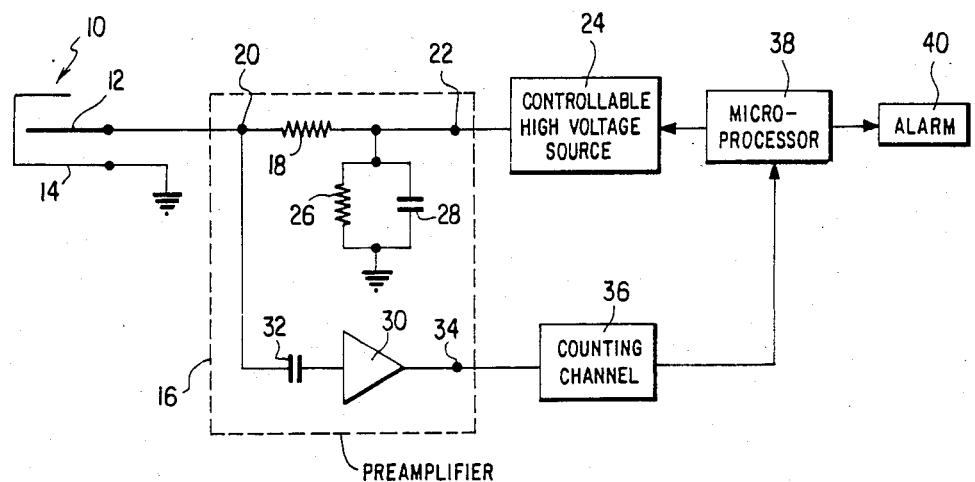
FIG. 2 is a partial block diagram and a partial circuit schematic of an arrangement for implementing the method according to the invention.

FIG. 2 illustrates a circuit for implementing the method according to the invention. A proportional counter 10, such as the BF$_3$ gas-filled device described above, having an electrode structure including a center wire for an anode 12 and a cathode 14 surrounding the wire anode 12, is connected at its anode 12 to a preamplifier 16. Cathode 14 is connected to ground.

The use of a preamplifier with a proportional counter in the context of source range detection is well known in the art and such preamplifiers are commercially available. For example, a preamplifier made by Westinghouse Electric Corporation and sold under Part No. 1469F29 could be used as preamplifier 16. The schematic for this preamplifier has been simplified for purposes of this disclosure. Essentially, preamplifier 16 includes a decoupling resistor 18 connected at one end to a terminal 20 adapted to be connected to anode 12 of proportional counter 10 and connected at its other end to a terminal 22 which is adapted to receive an input from a controllable high direct voltage source 24. A bleeder resistor 26 and a noise filtering capacitor 28 are connected in parallel between terminal 22 and ground. An amplifier 30 has its input coupled via a D.C. blocking capacitor 32 to terminal 20 and its output to a terminal 34 for passing amplified current pulses produced by counter 10 to a counting channel 36. Counting channel 36 may be implemented by Westinghouse Part No. 6081D50 or any other suitable source range counting equipment. Westinghouse Part No. 6081D50 has an analog voltage output which is calibrated in counts per second.

In accordance with the method of the invention, voltage source 24 is initially set to zero or a relatively low voltage so that proportional counter 10 is insufficiently energized to detect neutrons even while the reactor is operating in the intermediate or power range. As the voltage source 24 is gradually increased, counting channel 36 is used to detect when a neutron count is first generated by proportional counter 10. At that point the voltage of voltage source 24 is reduced, preferably to zero volts for reasons previously discussed. Thus, a method has been described for determining the operability of a source range detector at high power levels of a nuclear reactor without generating an excessive, damaging current through the electrode structure of the detector.

The method of the invention may also be carried out automatically with the use of a microprocessor 38, such as an Intel 8080. Microprocessor 38 is connected for controlling voltage source 24 automatically on a periodic basis. It is programmed to periodically gradually increase the voltage of the voltage source until a count is first generated by proportional counter 36. If no count is generated by the time voltage source 24 reaches the rated maximum operating voltage for the proportional counter, then microprocessor 38 activates an alarm 40, after which the necessary safeguards are undertaken by attending personnel.

As the proportional counter ages, its output will deteriorate. That is, for a given reactor power level, it will take a greater voltage across the electrodes to produce the same neutron count. In accordance with a further feature of the invention, this deterioration can be measured. Early in the life of the proportional counter, a calibration is performed, whereby the proportional counter is subjected to a given neutron flux corresponding to a given reactor power level above the source range of the reactor. As before, the voltage is gradually increased until a test voltage is reached at which the counting channel first registers a count indicating that neutrons are being detected by the detector. This test voltage is recorded and the proportional counter is de-energized.

Thereafter, the operability of the proportional counter is determined by subjecting the proportional counter to the same given neutron flux (i.e. same given reactor power level) and again noting the voltage level at which the proportional counter first generates a neutron count. The difference, if any, between this latter voltage and the test voltage obtained during the calibration corresponds to the degree of deterioration of the output of the proportional counter. Thus, according to this aspect of the invention the relative operability of the proportional counter is obtained with reference to a calibration point.

It will be understood that the above description of the present invention is susceptible to various modifications, changes and adaptations, and the same are intended to be comprehended within the meaning and range of equivalents of the appended claims.

I claim:

1. A method of determining the operability of a source range detector which is only operable in the source range of a nuclear reactor and which is located adjacent such a nuclear reactor, said source range detector registering a count corresponding to the neutrons emitted by the reactor when said reactor is operating within said source range and a predetermined operating voltage is applied across the electrodes of said detector, said detector being subject to destruction when said reactor power level is above the source range and said predetermined voltage is applied across its electrodes, said method comprising the steps of:

(a) operating said reactor at a power level above said source range;
(b) applying a voltage across the electrodes of said detector which does not cause said detector to register a neutron count;
(c) gradually increasing the magnitude of the voltage across the electrodes of said detector until said detector registers a neutron count;
(d) reducing the voltage across the electrodes of said detector; and
(e) replacing said detector if a neutron count is not registered in step (c) at a voltage having a magnitude about said predetermined operating voltage magnitude.

2. A method as claimed in claim 1 which further comprises the step of calibrating the detector by recording the voltage magnitude at which the detector registers a neutron count and thereafter repeating steps (a), (b), (c) and (d), said method additionally including the steps of comparing the voltage magnitude of the repeated steps at which the detector registers a neutron count with said recorded voltage magnitude and using the difference in voltage magnitudes as a measure of the operability of the detector.

3. A method as claimed in claim 1, including automatically carrying out steps (a), (b), (c) and (d) on a periodic basis.

4. A method as claimed in claim 1 which comprises the further step of activating an alarm if the detector does not register a neutron count at a voltage across the electrodes which is equal to or lower than said predetermined operating voltage magnitude.

5. A method of determining the operability of a source range detector which is only operable in the source range of a nuclear reactor and which is disposed in the vicinity of a nuclear reactor which is operating at a power level above the source range, the detector having electrodes and producing a current corresponding to a count of neutrons detected by the detector when a voltage is applied across its electrodes, comprising:

gradually increasing the voltage across the electrodes from a magnitude which does not cause said detector to produce a current corresponding to a neutron count to a magnitude at which the detector does produce such a current;

lowering the voltage to a magnitude which will not produce a current through the detector that would damage the detector at the highest power level of the reactor; and replacing the detector with an operable detector if the detector does not generate a current corresponding to a neutron count when the voltage across the electrodes reaches the rated maximum operating voltage of the detector, signifying that the detector is defective.

6. A method as claimed in claim 5 which further comprises the step of calibrating the detector by recording the voltage at which the detector first generates a current corresponding to a neutron count and thereafter repeating said increasing and lowering steps, said method additionally including the steps of comparing the voltage of the repeated steps at which the detector first generates a current corresponding to a neutron count with the recorded voltage and using the voltage difference as a measure of the operability of the detector.

7. A method as claimed in claim 5, wherein said increasing and lowering steps are automatically performed in sequence on a periodic basis.

8. A method as claimed in claim 5 which further comprises the step of activating an alarm if the detector does not generate a current corresponding to a neutron count at a voltage across the electrodes which is equal to or lower than the rated maximum operating voltage of the detector.

* * * * *